United States Patent
Makino et al.

(10) Patent No.: US 10,601,235 B2
(45) Date of Patent: Mar. 24, 2020

(54) ELECTRONIC CONTROL UNIT INCLUDING A FORCIBLE POWER SUPPLY INTERRUPTION DETERMINATION

(71) Applicant: KABUSHIKI KAISHA TOKAI RIKA DENKI SEISAKUSHO, Aichi (JP)

(72) Inventors: Masahiro Makino, Aichi (JP); Takashi Okumura, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 3 days.

(21) Appl. No.: 15/886,175

(22) Filed: Feb. 1, 2018

(65) Prior Publication Data

US 2018/0233933 A1    Aug. 16, 2018

(30) Foreign Application Priority Data

Feb. 14, 2017    (JP) .................................. 2017-025341

(51) Int. Cl.
*H02J 7/00* (2006.01)
*H02J 9/00* (2006.01)

(52) U.S. Cl.
CPC ............ *H02J 7/0031* (2013.01); *H02J 9/002* (2013.01); *H02J 2007/0095* (2013.01); *H02J 2007/0096* (2013.01); *H02J 2009/007* (2013.01)

(58) Field of Classification Search
CPC .................................................. H02J 7/0031
USPC ........................................................ 320/137
See application file for complete search history.

(56) References Cited

U.S. PATENT DOCUMENTS

| | | | |
|---|---|---|---|
| 8,392,731 B2 | 3/2013 | Asano et al. | |
| 8,583,323 B2 * | 11/2013 | Katou | B60L 1/00 |
| | | | 701/36 |
| 9,575,525 B2 | 2/2017 | Asano et al. | |
| 9,804,658 B2 | 10/2017 | Asano et al. | |
| 9,889,762 B2 * | 2/2018 | Takemoto | B60L 58/12 |
| 2009/0183018 A1 * | 7/2009 | Nakamura | B60W 50/04 |
| | | | 713/323 |
| 2018/0018011 A1 | 1/2018 | Asano et al. | |

FOREIGN PATENT DOCUMENTS

| | | |
|---|---|---|
| JP | 2009-166549 A | 7/2009 |
| JP | 2015-013641 A | 1/2015 |

* cited by examiner

*Primary Examiner* — Jerry D Robbins
(74) *Attorney, Agent, or Firm* — Greenblum & Bernstein, P.L.C.

(57) ABSTRACT

An electronic control unit includes a first controller, a second controller, and a determination portion. The first controller includes a first control portion that determines whether or not supply of power from a battery to the first controller is interruptible. The second controller includes a regulator that regulates power supplied from the battery to the first controller and a second control portion that controls the regulator. The determination portion determines whether or not the supply of power is forcibly interruptible even when the first control portion does not determine that the supply of power is interruptible. When the determination portion determines that the supply of power is forcibly interruptible, the second control portion controls the regulator to interrupt the supply of power from the battery to the first controller.

2 Claims, 3 Drawing Sheets

ELECTRONIC CONTROL UNIT INCLUDING A FORCIBLE POWER SUPPLY INTERRUPTION DETERMINATION

CROSS-REFERENCE TO RELATED APPLICATIONS

This application is based upon and claims the benefit of priority from prior Japanese Patent Application No. 2017-025341, filed on Feb. 14, 2017, the entire contents of which are incorporated herein by reference.

BACKGROUND ART

This disclosure relates to an electronic control unit.

To prevent draining of a battery installed on a vehicle, a known technique reduces the power consumption of an electronic control unit (ECU) by interrupting the supply of power to the ECU with a microcomputer. For example, Japanese Laid-Open Patent Publication No. 2015-13641 describes a regulator that is controlled based on whether or not a message exchanged between ECUs connected to a communication network conforms to a specified format to change the state of supply of power to the ECUs. When a certain condition is satisfied, the microcomputer generates a power supply interruption request indicating that the supply of power from the battery to an ECU is interruptible. The regulator is controlled based on the power supply interruption request to interrupt the supply of power to the ECU. This reduces the battery consumption.

SUMMARY OF THE INVENTION

However, for example, when the microcomputer fails to function to interrupt the power supply, the battery continues to supply power to the ECUs. Thus, the battery consumption cannot be reduced. Therefore, there is a demand for a method that reduces the battery consumption even when the power supply interruption function of the microcomputer fails.

One embodiment of an electronic control unit includes a first controller and a second controller arranged between a battery and the first controller and capable of communicating with the first controller. The first controller includes a first control portion that determines whether or not supply of power from the battery to the first controller is interruptible. The second controller includes a regulator that regulates power supplied from the battery to the first controller and a second control portion that controls the regulator. At least one of the first controller and the second controller further includes a determination portion that determines whether or not the supply of power is forcibly interruptible even when the first control portion does not determine that the supply of power is interruptible. When the determination portion determines that the supply of power is forcibly interruptible, the second control portion controls the regulator to interrupt the supply of power from the battery to the first controller.

Other embodiments and advantages thereof will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of an electronic control unit will now be described.

Figure 1:
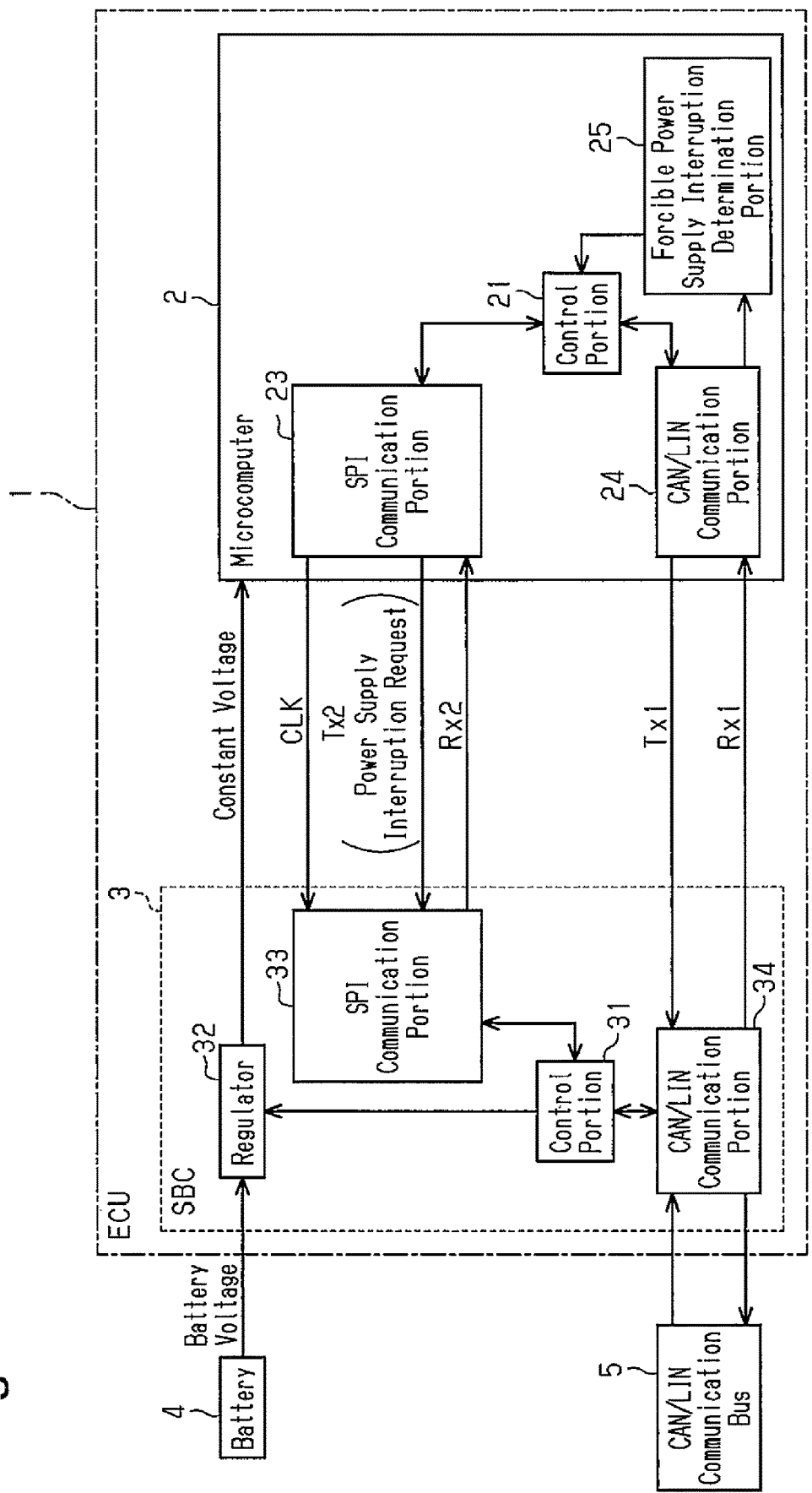
FIG. 1 is a block diagram schematically illustrating the structure of an electronic control unit according to one embodiment.

As illustrated in FIG. 1, an ECU 1 includes a microcomputer 2 and a system basis chip 3 (SBC). The ECU 1 is one example of an electronic control unit. The microcomputer 2 is one example of a first controller. The SBC 3 is one example of a second controller. When driven by power (battery voltage) supplied from a battery 4 of a vehicle, the ECU 1 executes various controls in the vehicle. The ECU 1 is capable of communicating with other on-board ECUs. Communication protocols used between the ECU 1 and the on-board ECUs are, for example, controller area network (CAN) communication and local interconnect network (LIN) communication. In the present example, the ECU 1 communicates with the on-board ECUs through a CAN/LIN communication bus 5. The microcomputer 2 and the SBC 3 communicate with each other. One example of a communication protocol used between the microcomputer 2 and the SBC 3 is serial peripheral interface (SPI) communication.

The microcomputer 2 includes a control portion 21, an SPI communication portion 23, a CAN/LIN communication portion 24, and a forcible power supply interruption determination portion 25. The control portion 21 corresponds to a first control portion. The microcomputer 2 controls control subject devices installed on the vehicle. In one example, the control subject devices are a motor and an indicator installed on the vehicle. However, the control subject devices are not limited to these devices.

The control portion 21 executes various controls in the vehicle. The control portion 21 is connected to the SPI communication portion 23 and the CAN/LIN communication portion 24. The control portion 21 determines whether or not the supply of power from the SBC 3 to the microcomputer 2, that is, from the battery 4 to the microcomputer 2, is interruptible. When the control portion 21 determines that the supply of power to the microcomputer 2 is interruptible, the control portion 21 generates a power supply interruption request and provides the power supply interruption request to the SBC 3. In one example, when the CAN communication is suspended, the control portion 21 determines whether or not the control subject devices (motor and indicator in present example) of the microcomputer 2 (control portion 21) are deactuated. When the control subject devices are deactuated during the suspension of the CAN communication, the control portion 21 determines that the supply of power from the battery 4 to the microcomputer 2 is interruptible, that is, determines that a power supply interruption condition (first power supply interruption condition) is satisfied. When the supply of power from the battery 4 to the microcomputer 2 (control portion 21) is interruptible, the control portion 21 transmits the power supply interruption request to the SBC 3 to notify that the interruption of the supply of power from the SBC 3 to the microcomputer 2 is desirable.

The SBC 3 includes a control portion 31, a regulator 32, an SPI communication portion 33, and a CAN/LIN communication portion 34. The control portion 31 corresponds to a second control portion. The control portion 31 is connected to the regulator 32, the SPI communication portion 33, and the CAN/LIN communication portion 34. The control portion 31 changes the state of the supply of power from the battery 4 to the microcomputer 2, which is regulated by the regulator 32, based on the power supply interruption request transmitted from the control portion 21.

The regulator 32 regulates power (battery voltage) supplied from the battery 4 to the microcomputer 2. In one example, the regulator 32 adjusts the power supplied from the battery 4 to a fixed voltage (constant voltage) suitable to operate the microcomputer 2. Additionally, the regulator 32 switches the power supply state from the battery 4 to the microcomputer 2 to a non-power supply state based on the power supply interruption request transmitted from the control portion 31.

The SPI communication portion 33 performs the SPI communication with the SPI communication portion 23 of the microcomputer 2. The CAN/LIN communication portion 34 converts an output signal from the CAN/LIN communication portion 24 of the microcomputer 2 into a signal suitable to transmit to the CAN/LIN communication bus 5 and transmits the converted signal to the CAN/LIN communication bus 5. Additionally, when the CAN/LIN communication portion 34 receives a signal transmitting through the CAN/LIN communication bus 5, the CAN/LIN communication portion 34 converts the received signal into a signal suitable to transmit to the microcomputer 2 and transmits the converted signal to the CAN/LIN communication portion 34 of the microcomputer 2.

As described above, the microcomputer 2 is connected to the CAN/LIN communication bus 5 by the CAN/LIN communication portion 34. The CAN/LIN communication portion 24 is electrically connected to the CAN/LIN communication portion 34 of the SBC 3, for example, by two signal lines, namely, a signal line Tx1 (for transmission) and a signal line Rx1 (for reception).

The SPI communication portion 23 is electrically connected to the SPI communication portion 33 of the SBC 3, for example, by three signal lines, namely, a signal line CLK, a signal line Tx2 (for transmission), and a signal line Rx2 (for reception). The microcomputer 2 transmits a clock signal to the SPI communication portion 33 through the signal line CLK. The microcomputer 2 transmits the power supply interruption request to the SPI communication portion 33 through the signal line Tx2. When the control portion 31 receives the power supply interruption request from the microcomputer 2, the control portion 31 controls the regulator 32 to reduce the power supplied to the microcomputer 2 (i.e., change power supply state).

In the microcomputer 2, the forcible power supply interruption determination portion 25 determines whether or not a forcible power supply interruption condition is satisfied and outputs the determination result. The forcible power supply interruption condition is a power supply interruption condition (second power supply interruption condition) that differs from the first power supply interruption condition. When the forcible power supply interruption condition is satisfied, the forcible power supply interruption determination portion 25 determines that the supply of power from the SBC 3 to the microcomputer 2, that is, from the battery 4 to the microcomputer 2, is interruptible and transmits an instruction signal for forcibly interrupting the supply of power to the microcomputer 2 to the control portion 21 (or SPI communication portion 23).

Therefore, even when the control portion 21 determines that the supply of power from the SBC 3 to the microcomputer 2 will not be interrupted (first power supply interruption condition is not satisfied), if the forcible power supply interruption condition (second power supply interruption condition) is satisfied, the control portion 21 determines that it is preferred that the supply of power be forcibly interrupted. Thus, regardless of whether or not the first power supply interruption condition is satisfied, when the forcible power supply interruption condition is satisfied, the control portion 21 generates a power supply interruption request based on the determination result of the forcible power supply interruption determination portion 25 and transmits the power supply interruption request to the SBC 3 via the SPI communication portion 23.

In one example, when a predetermined time (e.g., as long as ten minutes) elapses from when the CAN communication is stopped between the CAN/LIN communication portion 24 of the microcomputer 2 and the CAN/LIN communication portion 34 of the SBC 3, the forcible power supply interruption determination portion 25 determines that the forcible power supply interruption condition is satisfied. For example, when a situation continues for a long period of time in which the microcomputer 2 does not control the control subject devices and does not need the supply of power, the forcible power supply interruption condition may be satisfied. The predetermined time is set to enough time for the microcomputer 2 to determine that the supply of power is not needed.

The power supply interruption process executed by the ECU 1 will now be described.

Figure 2:
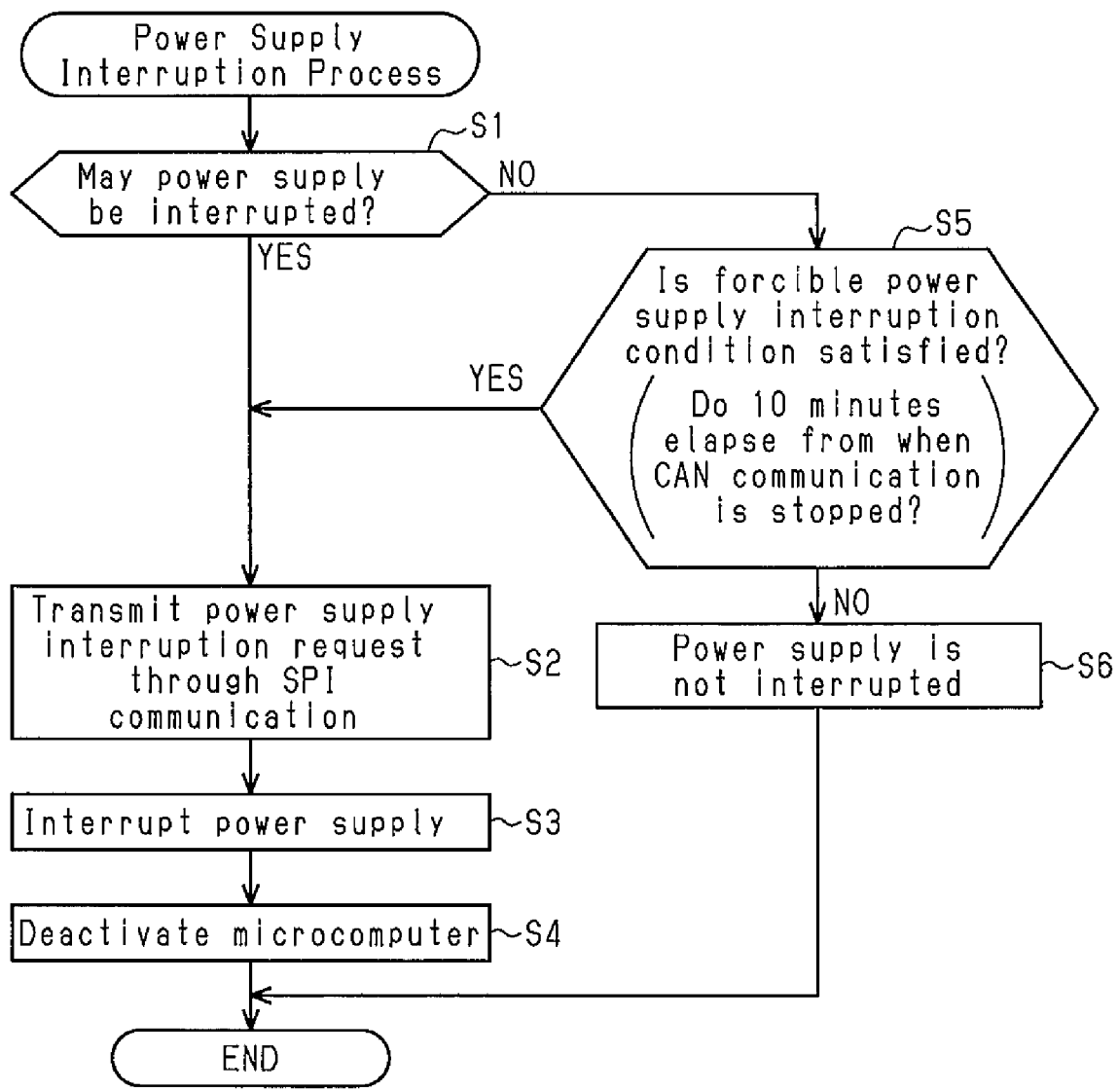
FIG. 2 is a flowchart schematically illustrating a power supply interruption process performed by an electronic control unit according to one embodiment.

As illustrated in FIG. 2, the control portion 21 of the ECU 1 determines whether or not the supply of power from the battery 4 to the microcomputer 2 through the regulator 32 of the SBC 3 may be interrupted (step S1). In the present example, the control portion 21 determines whether or not the power consumption of the microcomputer 2 can be reduced by switching the power supply state of the regulator 32, which supplies power from the battery 4 to the microcomputer 2, to the non-power supply state.

When the control portion 21 determines that the supply of power to the microcomputer 2 may be interrupted (YES in step S1), the control portion 21 transmits the power supply interruption request to the control portion 31 through the SPI communication established between the SPI communication portion 23 of the microcomputer 2 and the SPI communication portion 33 of the SBC 3 (step S2).

The control portion 31 of the ECU 1 controls the regulator 32 to interrupt the supply of power from the battery 4 to the microcomputer 2 (step S3) so that the microcomputer 2 is deactivated (step S4).

When the control portion 21 does not determine that the supply of power to the microcomputer 2 may be interrupted (NO in step S1), the forcible power supply interruption determination portion 25 of the ECU 1 determines whether or not the forcible power supply interruption condition is satisfied (step S5).

In one example, if there is a failure in a memory of the microcomputer 2 (memory to which control portion 21 is accessible such as RAM), the control portion 21 may fail to correctly determine whether the control subject devices (motor and indicator in present example) of the microcomputer 2 are actuated or deactuated. When such a failure occurs in the power supply interruption function of the microcomputer 2 (while other functions such as function to transmit power supply interruption request are normal), the control portion 21 does not determine that the power supply interruption condition (first power supply interruption condition) is satisfied even through the control subject devices are actually deactuated during the suspension of the CAN communication. As a result, despite the fact that the first power supply interruption condition is satisfied, the control portion 21 cannot determine that the first power supply interruption condition is satisfied. In such a situation, the forcible power supply interruption determination portion 25 determines whether or not the forcible power supply interruption condition (second power supply interruption condition) is satisfied (step S5).

When the forcible power supply interruption condition is satisfied (YES in step S5), the control portion 21 generates a power supply interruption request based on an instruction signal from the forcible power supply interruption determination portion 25 and transmits the power supply interruption request to the control portion 31 through the SPI communication established between the SPI communication portion 23 and the SPI communication portion 33 (step S2). The control portion 31 of the ECU 1 controls the regulator 32 to interrupt the supply of power from the battery 4 to the microcomputer 2 (step S3) so that the microcomputer 2 is deactivated (step S4).

When the forcible power supply interruption condition is not satisfied (NO in step S5), the control portion 21 does not transmit the power supply interruption request to the control portion 31 (step S6). Thus, the supply of power from the battery 4 to the microcomputer 2 is not interrupted.

Subsequently, for example, when the CAN communication and the LIN communication are performed between the CAN/LIN communication portion 24 of the microcomputer 2 and the CAN/LIN communication portion 34 of the SBC 3, the control portion 31 may control the regulator 32 to resume the supply of power from the battery 4 to the microcomputer 2.

The advantages of the present embodiment will now be described.

(1) In a comparative example, the microcomputer 2 does not include the forcible power supply interruption determination portion 25 (step S5 is omitted from FIG. 2). If the power supply interruption function of the microcomputer 2 fails causing the control portion 21 to be unable to determine whether or not the power supply interruption condition is satisfied, the power supply interruption condition will never be satisfied subsequently. In one example, due to a failure of the microcomputer 2 such as a memory error, the control portion 21 may fail to recognize that the control subject devices are deactuated. In this case, the control portion 21 cannot determine that the power supply interruption condition is satisfied. In another example, when the control portion 21 cannot control the control subject devices due to a failure of the microcomputer 2 such as a communication error, the control portion 21 also cannot determine whether or not the power supply interruption condition is satisfied. When such failures occur in the power supply interruption function, the control portion 21 does not determine in step S1 of FIG. 2 that the supply of power may be interrupted regardless of the situation in which the supply of power from the battery 4 to the microcomputer 2 is actually interruptible. As a result, the power continues to be supplied to the microcomputer 2. Thus, unnecessary consumption of the battery 4 cannot be reduced.

In this regard, in the present embodiment, the microcomputer 2 includes the forcible power supply interruption determination portion 25. Thus, even when the control portion 21 cannot determine that the supply of power may be interrupted, if the forcible power supply interruption condition is satisfied in step S5 of FIG. 2, the control portion 21 transmits the power supply interruption request to the SBC 3. Therefore, in a situation in which the supply of power from the battery 4 to the microcomputer 2 is interruptible, the continuation of the supply of power from the battery 4 to the microcomputer 2 is limited so that unnecessary consumption of the battery 4 is reduced.

(2) Even when the power supply interruption function of the ECU 1 fails, unnecessary consumption of the battery 4 is limited when the forcible power supply interruption condition is satisfied. This prevents complete depletion of the battery 4 of the vehicle until the ECU 1 is repaired or replaced.

It should be apparent to those skilled in the art that the foregoing embodiments may be implemented in many other specific forms without departing from the scope of this disclosure. Particularly, it should be understood that the foregoing embodiments may be implemented in the following forms.

In the above embodiment, the power supply interruption request is transmitted through the SPI communication established between the SPI communication portion 23 of the microcomputer 2 and the SPI communication portion 33 of the SBC 3. However, another communication protocol such as CAN communication may be used instead of the SPI communication.

In the above embodiment, the CAN communication and the LIN communication are performed as the communication protocols used between the ECU 1 and the on-board ECUs. However, other communication protocols such as FlexRay may be used instead of the CAN communication and the LIN communication.

In the above embodiment, when the control subject devices are deactuated during the suspension of the CAN communication, the control portion 21 of the microcomputer 2 determines that the supply of power from the battery 4 to the microcomputer 2 may be interrupted. Instead, for example, when the microcomputer 2 is on standby during the suspension of the CAN communication, the control portion 21 may determine that the supply of power from the battery 4 to the microcomputer 2 may be interrupted.

In the above embodiment, when the predetermined time (e.g., as long as ten minutes) elapses from when the CAN communication is stopped between the CAN/LIN communication portion 24 of the microcomputer 2 and the CAN/LIN communication portion 34 of the SBC 3, it is determined that the forcible power supply interruption condition is satisfied. Instead, after the CAN communication is stopped, when an instruction for driving a control subject device (e.g., motor installed on vehicle) has not been output for a predetermined time, it may be determined that the forcible power supply interruption condition is satisfied. The SBC 3 handles very limited information such as information of the CAN communication. The information of the CAN communication obtained from the SBC 3 is used to determine the forcible power supply interruption condition. This simplifies the configuration and process of the power supply interruption function.

Figure 3:
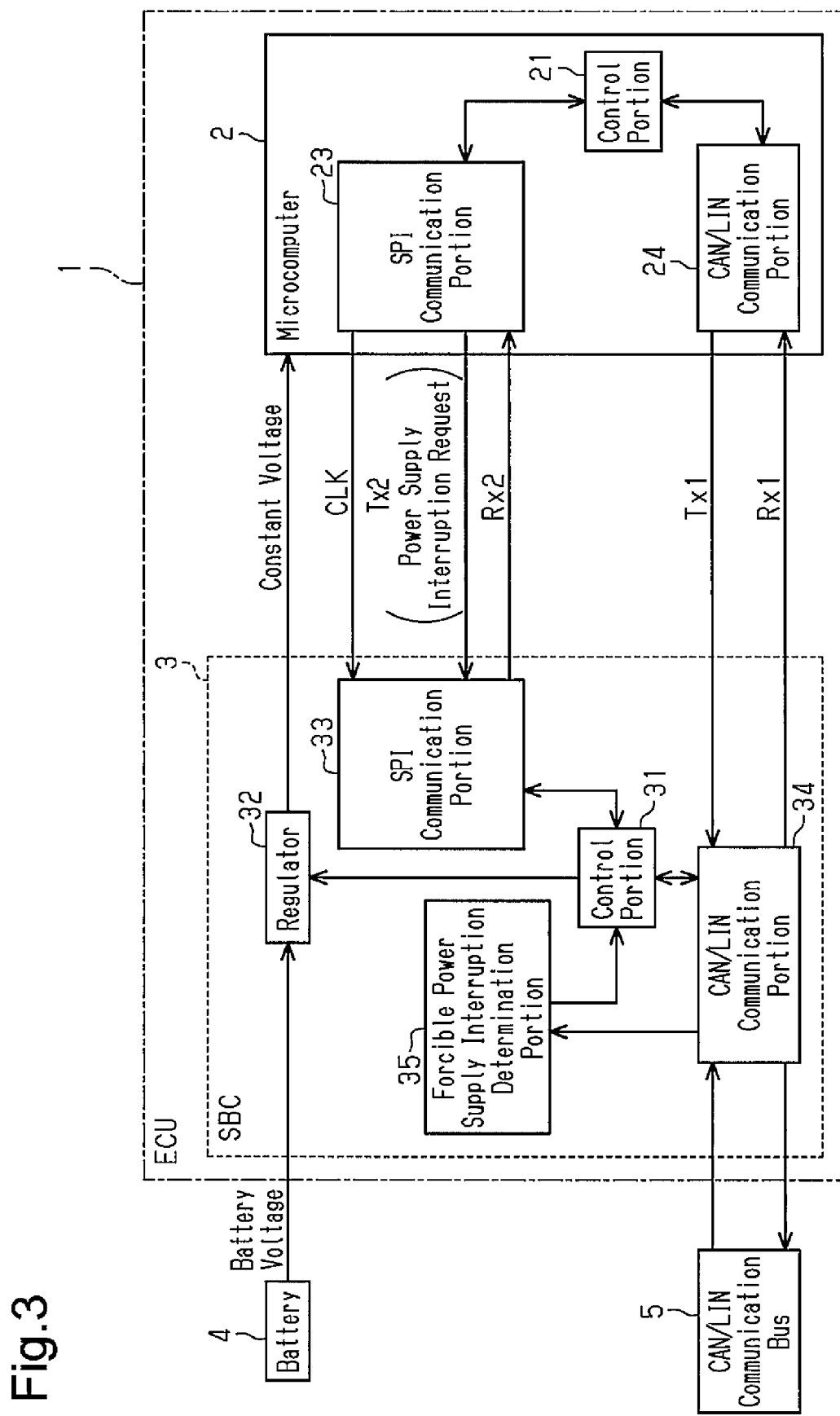
FIG. 3 is a block diagram schematically illustrating the structure of an electronic control unit according to another embodiment.

In the above embodiment, the microcomputer 2 includes the forcible power supply interruption determination portion 25. Instead, for example, as illustrated in FIG. 3, the SBC 3 may include a forcible power supply interruption determination portion 35. In this case, when the forcible power supply interruption determination portion 35 recognizes that the forcible power supply interruption condition is satisfied, the control portion 31 controls the regulator 32 to interrupt the supply of power from the battery 4 to the microcomputer 2. Further, while the microcomputer 2 includes the forcible power supply interruption determination portion 25, the SBC 3 may also include the forcible power supply interruption determination portion 35.

The ECU 1 may be embodied in various electronic control units installed on a vehicle such as an electric power steering device, a motor control unit, and a heater controller.

The electronic control units in the above embodiment and the above modified examples may be embodied as a device that includes at least one processor and a memory storing at least one program. The program may include instructions, when executed by the processor, that cause the device (i.e., electronic control unit) to perform any of the power supply interruption processes described above, for example, the power supply interruption process according to the method illustrated in FIG. 2. Further, a non-transitory computer-readable storage medium including such instructions that cause the device to perform the power supply interruption process may also be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. An electronic control unit comprising:
   a first controller; and
   a second controller arranged between a battery and the first controller and capable of communicating with the first controller, wherein
   the first controller includes:
      a first control portion that determines whether or not supply of power from the battery to the first controller is interruptible; and
      a first communication portion,
   the second controller includes:
      a regulator that regulates power supplied from the battery to the first controller;
      a second control portion that controls the regulator to interrupt the supply of power from the battery to the first controller in response to the first control portion determining that the supply of power is interruptible; and
      a second communication portion located between a communication bus and the first controller to receive a signal from another electronic control unit via the communication bus and transmit the signal to the first communication portion,
   at least one of the first controller and the second controller further includes a determination portion that determines whether or not the supply of power is forcibly interruptible even when the first control portion does not determine that the supply of power is interruptible,
   the determination portion determines that the supply of power is forcibly interruptible when a predetermined time elapses from when communication performed between the first communication portion and the second communication portion is stopped, and
   when the determination portion determines that the supply of power is forcibly interruptible, the second control portion controls the regulator to interrupt the supply of power from the battery to the first controller.

2. The electronic control unit according to claim 1, wherein
   the first control portion determines that the supply of power is interruptible when a first power supply interruption condition is satisfied, and
   the determination portion determines that the supply of power is forcibly interruptible when a second power supply interruption condition is satisfied, wherein the second power supply interruption condition differs from the first power supply interruption condition.

* * * * *